United States Patent
Healy et al.

(10) Patent No.: US 7,246,002 B2
(45) Date of Patent: Jul. 17, 2007

(54) METHOD FOR CONTROLLING FUEL SPLITS TO GAS TURBINE COMBUSTOR

(75) Inventors: Timothy Andrew Healy, Simpsonville, SC (US); Derrick Walter Simons, Greer, SC (US)

(73) Assignee: General Electric Company, Schenectady, NY (US)

( * ) Notice: Subject to any disclaimer, the term of this patent is extended or adjusted under 35 U.S.C. 154(b) by 531 days.

(21) Appl. No.: 10/716,454

(22) Filed: Nov. 20, 2003

(65) Prior Publication Data

US 2005/0114010 A1   May 26, 2005

(51) Int. Cl.
*F02C 9/00* (2006.01)
*F02C 7/00* (2006.01)
*G06F 19/00* (2006.01)
*G06G 7/48* (2006.01)

(52) U.S. Cl. .................. 701/100; 701/99; 477/30; 60/39.281; 60/803

(58) Field of Classification Search .............. 701/100, 701/99; 415/13; 477/30; 374/144; 702/130, 702/50; 60/272, 39.281, 803
See application file for complete search history.

(56) References Cited

U.S. PATENT DOCUMENTS

| | | | | |
|---|---|---|---|---|
| 5,539,638 A * | 7/1996 | Keeler et al. | ................. | 701/29 |
| 5,703,777 A * | 12/1997 | Buchhop et al. | ............ | 701/109 |
| 5,761,895 A | 6/1998 | Chu et al. | | |
| 6,189,523 B1 * | 2/2001 | Weisbrod et al. | ........... | 123/672 |
| 6,382,177 B1 * | 5/2002 | Saito | ........................... | 123/299 |
| 6,697,729 B2 * | 2/2004 | Wright | ...................... | 701/104 |
| 6,810,655 B2 * | 11/2004 | Davis et al. | ............. | 60/39.281 |
| 6,882,929 B2 * | 4/2005 | Liang et al. | ................. | 701/115 |
| 2002/0083712 A1 | 7/2002 | Tomlinson et al. | | |
| 2002/0106001 A1 | 8/2002 | Tomlinson et al. | | |

OTHER PUBLICATIONS

A.J. Volponi, "Gas Turbine Parameter Corrections", Journal of Engineering for Gas Turbines and Power, Copyright © 1999 by ASME, Oct. 1999, vol. 121, pp. 613-621.
D. Johnson et al, "Speedtronic™ Mark V Gas Turbine Control System", pp. 1-18.
J. Kure-Jensen et al, "Speedtronic™ Mark V Steam Turbine Control System", © 1996 GE Company, pp. 1-15.
Roointon Pavri et al, "Gas Turbine Emissions and Control", GE Power Systems GER-4211 (Mar. 2001), pp. 1-32.
Walter Barker et al, "Speedtronic™ Mark VI Turbine Control System", GE Power Systems GER-4193A (Oct. 2000), pp. 1-14.

* cited by examiner

*Primary Examiner*—Thomas Black
*Assistant Examiner*—Christine M. Behncke
(74) *Attorney, Agent, or Firm*—Nixon & Vanderhye, P.C.

(57) ABSTRACT

A method for determining a target exhaust temperature for a gas turbine including: determining a target exhaust temperature based on a compressor pressure condition; determining a temperature adjustment to the target exhaust temperature based on at least one parameter of a group of parameters consisting of specific humidity, compressor inlet pressure loss and turbine exhaust back pressure; and adjusting the target exhaust temperature by applying the temperature adjustment.

14 Claims, 4 Drawing Sheets

METHOD FOR CONTROLLING FUEL SPLITS TO GAS TURBINE COMBUSTOR

BACKGROUND OF THE INVENTION

The present invention relates generally to controllers for a combustion system for a gas turbine. In particular, the invention relates to a combustor control algorithm for fuel splits and nitrogen oxide/nitrogen dioxide (NOx) leveling.

Industrial and power generation gas turbines have control systems ("controllers") that monitor and control their operation. These controllers govern the combustion system of the gas turbine. Dry Low NOx (DLN) combustion systems are designed to minimize emissions of NOx from gas turbines. The controller executes an algorithm to ensure safe and efficient operation of the DLN combustion system. Conventional DLN algorithms receive as inputs measurements of the actual exhaust temperature of the turbine and the actual operating compressor pressure ratio. DLN combustion systems typically rely on the measured turbine exhaust temperature and compressor pressure ratio to set the gas turbine operating condition, e.g., desired turbine exhaust temperature, total combustor fuel flow, fuel split schedules, and inlet bleed heat flow.

Conventional scheduling algorithms for DLN combustion systems do not generally take into account variations in compressor inlet pressure loss, turbine back pressure, or compressor inlet humidity. Conventional scheduling algorithms generally assume that ambient conditions, e.g., compressor inlet humidity, compressor inlet pressure loss, and turbine back pressure remain at certain defined constant conditions or that variations in these conditions do not significantly affect the target combustor firing temperature.

Compressor inlet pressure loss and turbine back-pressure levels will vary from those used to define the DLN combustion settings. The $NO_x$ emissions from the gas turbine may increase beyond prescribed limits, if the conventional DLN combustion system is not adjusted as environmental conditions change. Seasonal variations in humidity or changes in turbine inlet humidity from various inlet conditioning devices, e.g., evaporative cooler, fogging systems, can influence the operation of a DLN combustion system. As the ambient conditions change with the seasons, the settings of DLN combustion systems are often manually adjusted to account for ambient seasonal variations.

BRIEF SUMMARY OF THE INVENTION

The invention may be embodied as a method for scheduling a fuel split for a gas turbine combustor comprising: determining a target exhaust temperature that would produce the desired NOx at the reference fuel splits (based on at least one parameter of a group of parameters consisting of specific humidity, compressor inlet pressure loss and turbine exhaust back pressure); determining an exhaust temperature error based on the difference between the scheduled exhaust temperature and the exhaust temperature that would produce the desired NOx at the reference fuel splits; converting the exhaust temperature error to a projected NOx level error at the reference fuel splits, and converting the projected NOx level error to adjustments to the fuel split levels.

The invention may also be embodied as a method for scheduling a fuel split for a gas turbine combustor comprising: determining a target exhaust temperature corresponding to a desired NOx at a reference fuel split; determining an exhaust temperature error based on a comparison between a scheduled exhaust temperature and the target exhaust temperature; converting the exhaust temperature error to a projected NOx leveling fuel split adjustment; adjusting the reference fuel split using the projected NOx leveling fuel split adjustment, and applying the adjusted fuel split to determine fuel flow to the combustor.

The invention may be further embodied as a method for adjusting a base fuel split schedule for a gas turbine combustor comprising: determining a corrected target turbine exhaust temperature based on a compressor pressure condition; determining a first corrected temperature adjustment to the corrected target exhaust temperature based on at least one parameter of a group of parameters consisting of compressor inlet pressure loss and turbine exhaust back pressure; determining a second corrected temperature adjustment to the corrected target exhaust temperature based on a nitrogen oxide (NOx) limiting requirement and the base fuel split command; determining an adjusted corrected target exhaust temperature based on the first corrected temperature adjustment and the second corrected temperature adjustment; determining an uncorrected adjusted target exhaust temperature based on a temperature of a discharge of a compressor of the gas turbine and the adjusted corrected target exhaust temperature; determining a temperature difference between the uncorrected adjusted corrected target exhaust temperature and an uncorrected target exhaust temperature selected from a combustor temperature leveling algorithm, and applying the temperature difference to generate an adjusted base fuel split schedule.

BRIEF DESCRIPTION OF THE DRAWINGS

The accompanying drawings in conjunction with the text of this specification describe an embodiment of the invention.

DETAILED DESCRIPTION OF THE INVENTION

A gas turbine control system and method of algorithms has been developed to schedule the operation of a gas turbine such that the turbine exhaust temperature and combustor fuel splits are cooperatively scheduled. By linking algorithms for determining the turbine exhaust temperature and fuel splits, the gas turbine control system can simultaneously level the combustor temperature rise (when not otherwise limited), and NOx emissions. This feature is especially useful during part-load gas turbine operation.

Part load operation of a gas turbine often involves a control system adjusting a total fuel flow to achieve the part-load level and adjusting the compressor inlet guide vane (IGVs) to set the gas turbine cycle match point for the desired part-load level. Further, the controller schedules the fuel splits for the combustor to maintain the desired combustion mode, e.g., part-load total fuel flow, and operate the gas turbine within established operability boundaries, such as for combustion dynamics. Moreover, during part-load operation, the cycle match point and combustor fuel splits greatly influence the NOx emissions. To optimize the operation of the gas turbine during part load operation, the controller simultaneously applies a NOx leveling algorithm and other algorithms to control the combustor temperature rise.

Figure 1:
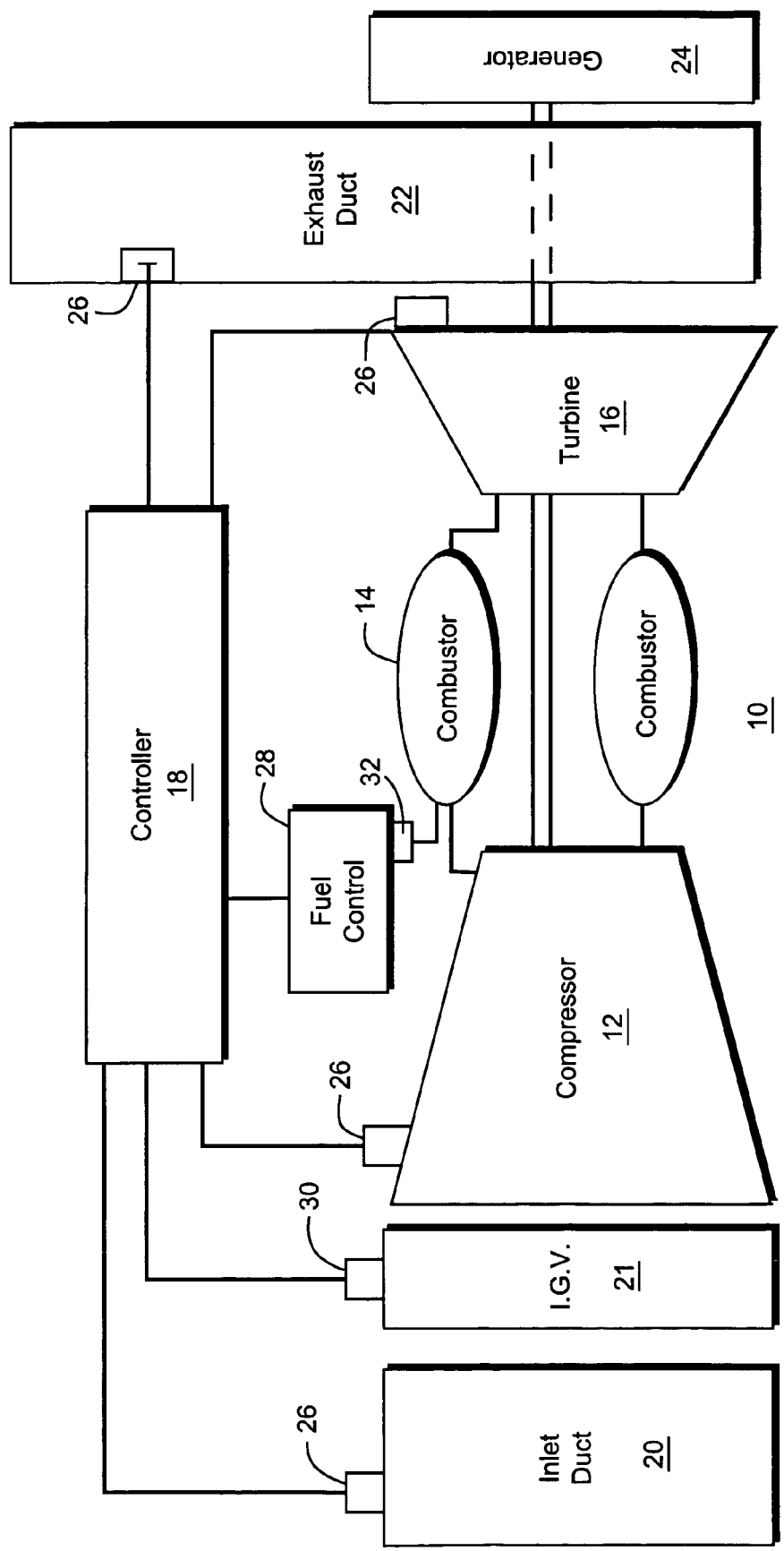
FIG. 1 is a schematic depiction of a gas turbine having a fuel control system.

FIG. 1 depicts a gas turbine 10 having a compressor 12, combustor 14, turbine 16 drivingly coupled to the compressor, and a control system (controller) 18. An inlet duct 20 to the compressor feeds ambient air and possibly injected water to the compressor. The inlet duct may have ducts, filters, screens and sound absorbing devices that contribute to a pressure loss of ambient air flowing through the inlet 20 into inlet guide vanes 21 of the compressor. An exhaust duct 22 for the turbine directs combustion gases from the outlet of the turbine through, for example, emission control and sound absorbing devices. The exhaust duct 22 may include sound adsorbing materials and emission control devices that apply a backpressure to the turbine. The amount of inlet pressure loss and back pressure may vary over time due to the addition of components to the ducts 20,22, and to dust and dirt clogging the inlet and exhaust ducts. The turbine may drive a generator 24 that produces electrical power. The inlet loss to the compressor and the turbine exhaust pressure loss tend to be a function of corrected flow through the gas turbine. Further, the amount of inlet loss and turbine back pressure may vary with the flow rate through the gas turbine.

The operation of the gas turbine may be monitored by several sensors 26 detecting various conditions of the turbine, generator and ambient environment. For example, temperature sensors 26 may monitor ambient temperature surrounding the gas turbine, compressor discharge temperature, turbine exhaust gas temperature, and other temperature measurements of the gas stream through the gas turbine. Pressure sensors 26 may monitor ambient pressure, and static and dynamic pressure levels at the compressor inlet and outlet, turbine exhaust, at other locations in the gas stream through the gas turbine. Humidity sensors 26, e.g., wet and dry bulb thermometers, measure ambient humidity in the inlet duct of the compressor. The sensors 26 may also comprise flow sensors, speed sensors, flame detector sensors, valve position sensors, guide vane angle sensors, or the like that sense various parameters pertinent to the operation of gas turbine 10. As used herein, "parameters" refer to items that can be used to define the operating conditions of turbine, such as temperatures, pressures, and gas flows at defined locations in the turbine. These parameters can be used to represent a given turbine operating condition.

A fuel control system 28 regulates the fuel flowing from a fuel supply to the combustor 14, and the split between the fuel flowing into primary and secondary fuel nozzles, and the fuel mixed with secondary air flowing into a combustion chamber. The fuel controller may also select the type of fuel for the combustor. The fuel control system 28 may be a separate unit or may be a component of a larger controller 18. The fuel control system may also generate and implement fuel split commands that determine the portion of fuel flowing to primary fuel nozzles and the portion of fuel flowing to secondary fuel nozzles.

The controller 18 may be a General Electric SPEEDTRONIC™ Gas Turbine Control System, such as is described in Rowen, W. I., "SPEEDTRONIC™ Mark V Gas Turbine Control System", GE-3658D, published by GE Industrial & Power Systems of Schenectady, N.Y. The controller 18 may be a computer system having a processor (s) that executes programs to control the operation of the gas turbine using sensor inputs and instructions from human operators. The programs executed by the controller 18 may include scheduling algorithms for regulating fuel flow to the combustor 14. The commands generated by the controller cause actuators on the gas turbine to, for example, adjust valves (actuator 32) between the fuel supply and combustors that regulate the flow, fuel splits and type of fuel flowing to the combustors; adjust inlet guide vanes 21 (actuator 30) on the compressor, and activate other control settings on the gas turbine.

The controller 18 regulates the gas turbine based, in part, on algorithms stored in computer memory of the controller. These algorithms enable the controller 18 to maintain the NOx and CO emissions in the turbine exhaust to within certain predefined emission limits, and to maintain the combustor firing temperature to within predefined temperature limits. The algorithms have inputs for parameter variables for current compressor pressure ratio, ambient specific humidity, inlet pressure loss and turbine exhaust back pressure. Because of the parameters in inputs used by the algorithms, the controller 18 accommodates seasonal variations in ambient temperature and humidity, and changes in the inlet pressure loss through the inlet 20 of the gas turbine and in the exhaust back pressure at the exhaust duct 22. An advantage of including input parameters for ambient conditions, and inlet pressure loss and exhaust back pressure is that the $NO_x$, CO and turbine firing algorithms enable the controller to automatically compensate for seasonal variations in gas turbine operation and changes in inlet loss and in back pressure. Accordingly, the need is reduced for an operator to manually adjust a gas turbine to account for seasonal variations in ambient conditions and for changes in the inlet pressure loss or turbine exhaust back pressure.

The combustor 14 may be a DLN combustion system. The control system 18 may be programmed and modified to control the DLN combustion system. The DLN combustion control algorithms for determining fuel splits are set forth in FIGS. 2 to 5.

The schedules and algorithms executed by the controller 18 accommodate variations in ambient conditions (temperature, humidity, inlet pressure loss, and exhaust back pressure) that affect NOx, combustor dynamics, and firing temperature limits at part-load gas turbine operating conditions. The control system 18 simultaneously schedules exhaust temperature and combustor fuel splits. The control system 18 applies algorithms for scheduling the gas turbine, e.g., setting desired turbine exhaust temperatures and combustor fuel splits, so as to satisfy performance objectives while complying with operability boundaries of the gas turbine. The turbine control system 18 simultaneously determines level combustor temperature rise and NOx during part-load operation in order to increase the operating margin to the combustion dynamics boundary and thereby improve operability, reliability, and availability of the gas turbine.

The combustor fuel splits are scheduled by the control system 18 to maintain the desired combustion mode while observing other operability boundaries, such as combustion dynamics. At a given load level, the cycle match point and the combustor fuel splits influence the resultant NOx emissions. Simultaneously leveling NOx and combustor temperature rise during part-load operation minimizes the level of combustion dynamics and expands the operational envelope of the gas turbine without adversely impacting emissions compliance or parts life.

Figure 2:
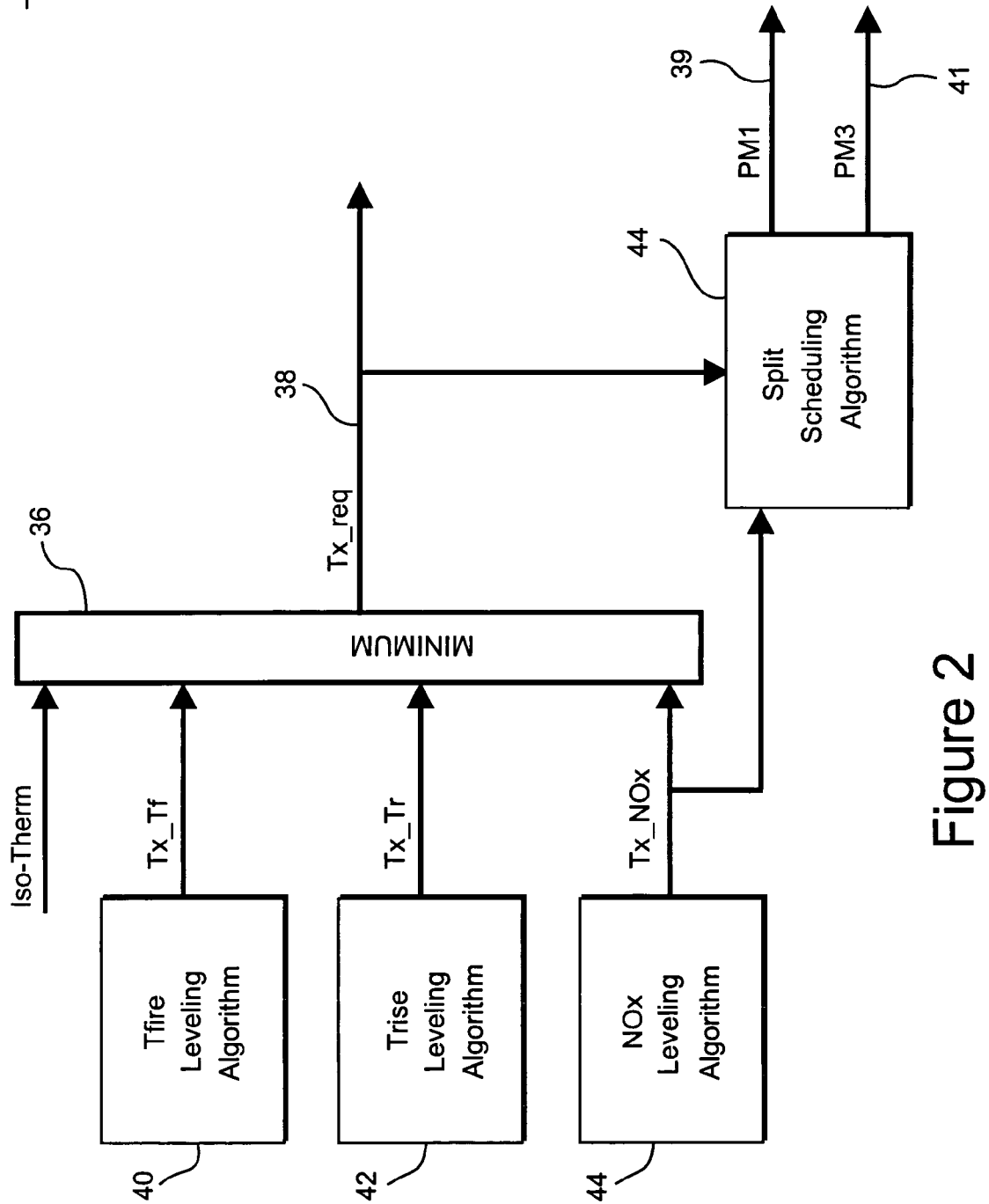
FIG. 2 is a high-level block diagram of a system for selecting a desired turbine exhaust temperature and fuel split schedule.

FIG. 2 is a high-level block diagram of a process 34 for selecting a desired turbine exhaust temperature target (Tx_req) and adjusted fuel split (PM1, PM3) 39 and 41. The process and associated algorithms disclosed herein are primarily directed to a NOx leveling algorithm 74 (FIG. 4) that determines a fuel split adjustment. The NOx leveling algorithm requires as an input the actual scheduled turbine exhaust temperature target (Tx_req) 38. The manner in which the desired turbine exhaust temperature target is determined may vary without departing from the scope or intent of the technique for applying the NOx leveling algorithm 74 to determine adjusted fuel split input parameters (PM1, PM3) 39 and 41 for the fuel controller 28.

The overall process 34 includes a selection logic 36 that selects a combustion exhaust temperature target (Tx_req) 38 from a plurality of proposed temperatures by applying a certain logic, such as selection of the lowest temperature of the input temperature targets. These proposed exhaust temperature targets include: a maximum exhaust temperature (Iso-Therm), a desired exhaust temperature (Tx_Tf) generated by a firing temperature leveling algorithm 40, a desired exhaust temperature (Tx_Tr) generated by a combustor temperature rise leveling algorithm 42, and a desired exhaust temperature (Tx_NOx) generated by a combustor temperature rise leveling algorithm 44. The scheduled exhaust temperature 38 is compared by the controller 18 to the actual turbine exhaust temperature. The difference between the desired and actual exhaust temperatures is applied by the controller to regulate the fuel flow to the combustor or the angle of the IGVs 21 (when operating part-load).

The NOx leveling algorithm 44 outputs an adjusted fuel split commands (PM1, PM3) 39 and 41 to the fuel controller 28. The fuel split commands are collectively the fuel split schedule. The fuel split commands indicates the portion of the fuel that is to flow to the various zones of fuel injectors, e.g., primary fuel nozzle and secondary fuel injectors for mixing fuel with secondary air entering the combustors. The NOx leveling algorithm is one technique to reduce NOx emissions from the turbine and to maintain NOx emissions within emission limits.

Figure 3:
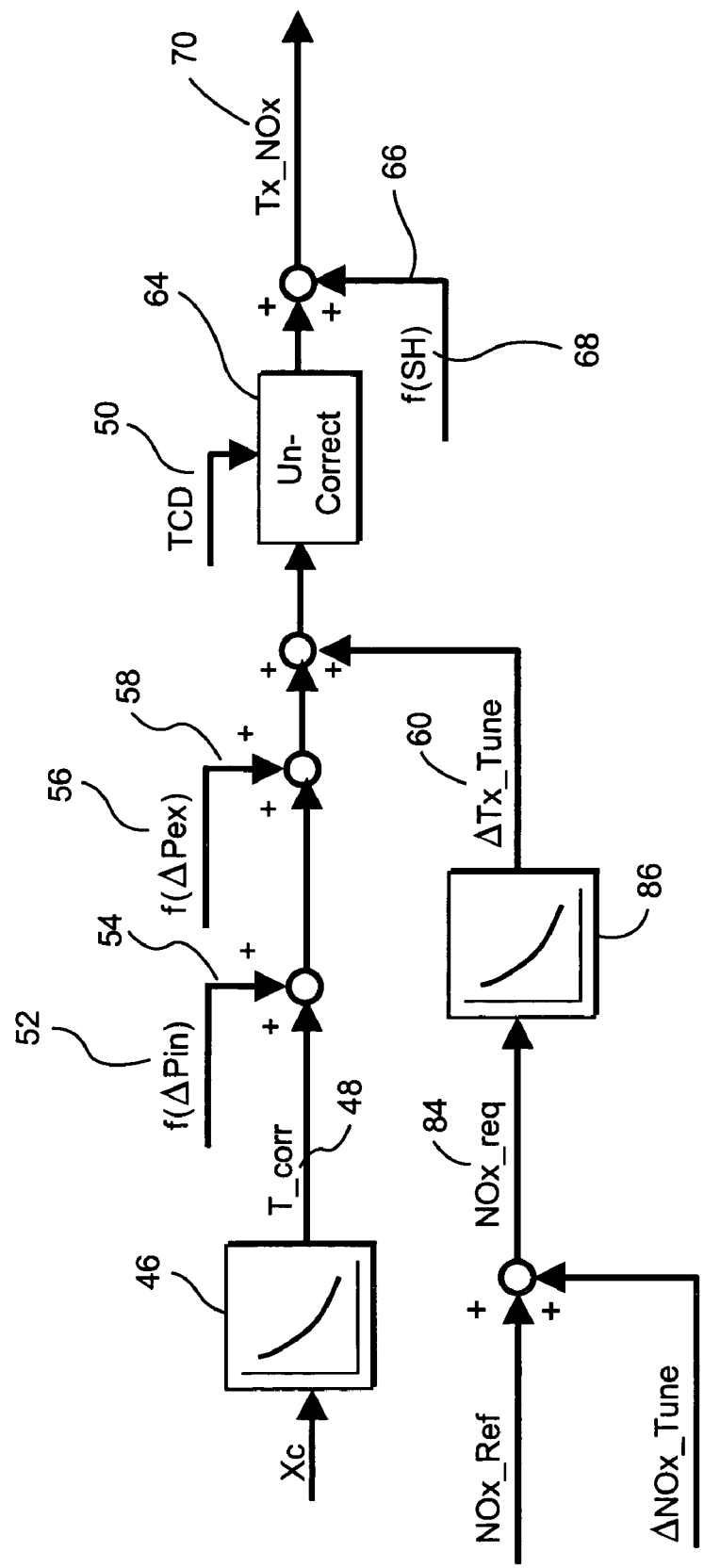
FIG. 3 is a diagram of an exemplary algorithm for calculating the exhaust temperature that would produce the desired NOx at the reference fuel splits.

FIG. 3 is a block diagram illustrating the NOx leveling algorithm 44 that relies on a relatively simple and easily executed exhaust temperature versus compressor pressure ratio ($X_c$) relationships 46 to determine the desired operating conditions, e.g., fuel splits and exhaust temperature. These relationships are stored in the electronic memory of the control system 18 and may include data look-up tables, mathematical functions (such as first or second order curve functions) and other forms of electronically representing a parameter relationship.

The NOx leveling algorithm 44 receives input data regarding the current compressor pressure ratio (Xc or CPR), a NOx emission limit (NOx_req) 84 (which is a sum of the NOx emission limit and a delta NOx tuning factor (ΔNOx_tune) that is a constant NOx adjustment determined for each specific gas turbine), the current specific humidity (SH) 68 of the ambient air entering the compressor 12, an inlet pressure loss ΔPin 52, and a turbine back pressure delta ΔPex 56. Based on these input parameters, the NOx algorithm 44 produces an exhaust temperature 70 that would produce the desired NOx level at the reference fuel splits.

The NOx leveling algorithm 44 includes a schedule 46 for applying the compressor pressure ratio (Xc) to derive a corrected turbine exhaust temperature target 48 (T_corr) for the NOx algorithm. The schedule 46 of corrected exhaust temperature versus compressor pressure ratio (control curve) outputs a corrected turbine exhaust temperature target 48 (T_corr) for defined reference parameter conditions of: NOx target, fuel splits, humidity, inlet pressure loss, and exhaust back pressure. The compressor pressure ratio vs. exhaust temperature target schedule 46 may be a graph, look-up table or function that correlates the compressor pressure ratio to a corrected exhaust temperature target 48. The schedule 46 is determined for a gas turbine or gas turbine type or class in a conventional manner that is outside the scope of the present invention.

The corrected exhaust temperature 48 is adjusted to correct for off-reference inlet pressure loss (ΔPin), off-reference exhaust back pressure (ΔPex), off-reference NOx target, and off-reference humidity. An inlet pressure loss function (f(ΔPin)) 52 is applied to determine an adjustment to the corrected exhaust temperature due to a difference (ΔPin) in actual inlet pressure loss from a base inlet pressure loss level. The inlet pressure loss function may be an empirically derived graph, look-up table or function that correlates the inlet pressure loss difference (ΔPin) to an adjustment 54 to the corrected exhaust temperature target 48. This function 52 may be derived for a particular class, model, or type of gas turbine and/or for a particular arrangement of inlet ducts and inlet components. Alternatively, the pressure loss function may have input variables of the inlet pressure loss difference (ΔPin) and the compressor ratio level (CPR). The pressure loss function 52 generates a temperature target adjustment 54 to be summed with the corrected exhaust temperature target 48.

Similarly, a turbine back pressure function (ΔPex) 56 has an input variable of a difference (ΔPex) between the actual turbine back pressure and a base turbine back pressure level. The back pressure function 56 may have CPR as a second input variable. The turbine back pressure function generates a temperature target adjustment 58 to be summed with the corrected exhaust temperature 48. A further temperature target adjustment (ΔTx_Tune) 60 is generated from an adjusted target NOx level 84 (NOx_req) and is summed with the corrected exhaust temperature target 48. The corrected exhaust temperature target 48 (after being adjusted to account for compressor inlet pressure loss, exhaust back pressure and target NOx level) is uncorrected by applying a correction factor 64 that is a non-integer exponent of a ratio of the compressor discharge temperature (TCD) and a reference TCD. The value of the non-integer exponent is empirically derived for the class or model of gas turbine. The correction factor 64 is the inverse of the correction factor used to collapse the part-load exhaust temperature versus TCD data over the load range of the gas turbine in FIG. 4.

The uncorrected exhaust temperature target is further summed with a temperature target correction 66 generated by a specific humidity function (f(SH)) 68 that is an empirically derived function having as inputs the ambient specific humidity and, possibly, the compressor ratio (CPR). The result is the exhaust temperature target (Tx_NOx) 70 that is the exhaust temperature that would produce the desired NOx level at the reference fuel splits under the current operational conditions.

Figure 4:
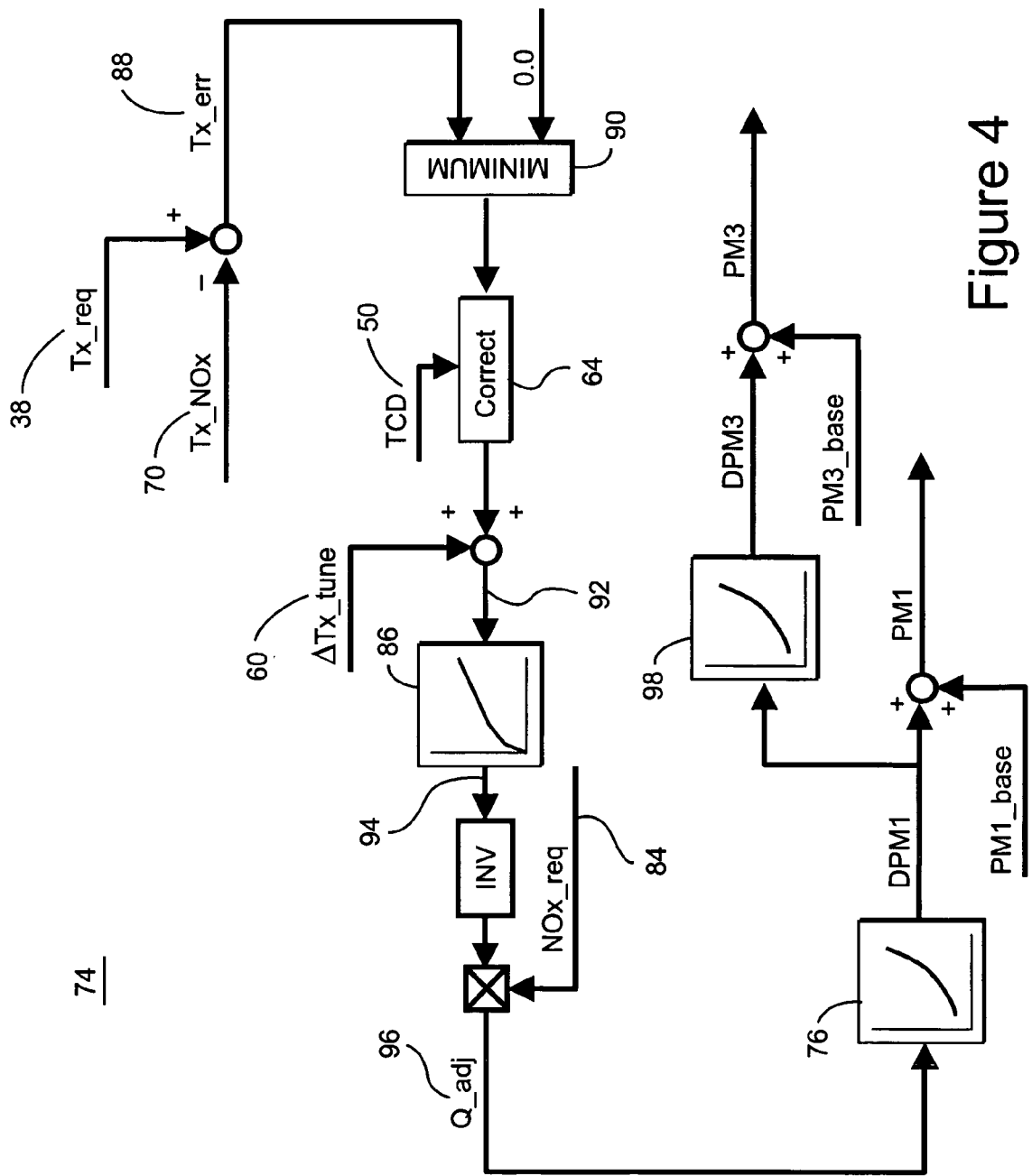
FIG. 4 is a diagram of an exemplary base fuel split adjustment algorithm for a NOx leveling algorithm.

FIG. 4 is a schematic diagram of the fuel split scheduling algorithm 74 which generates the adjusted fuel splits (PM1, PM3). The adjustments (DPM1 and DPM3) to the base fuel splits (PM1_base and PM3_base) reflect NOx leveling adjustments to the fuel splits. This algorithm 74 accept as input the exhaust temperature (Tx_NOx) 70 that would produce the desired NOx level at the reference fuel splits, and the actual scheduled exhaust temperature (Tx_req) 38. A delta exhaust temperature difference (Tx_err) 88 is the difference between the temperature level 70 that would level NOx to the target and the temperature 38 that is actually scheduled. The temperature difference (Tx_err) 70 is limited to a positive value by a minimum select logic 90 that selects the larger of a positive difference Tx_err or zero. The positive temperature difference Tx_err is corrected by applying the correction factor 64 that is a non-integer exponent of a ratio of the compressor discharge temperature (TCD) and a reference TCD. In addition the corrected temperature difference is summed with the corrected NOx temperature correction (ΔTx_Tune) 60 generated by the NOx target adjustment. The summed corrected temperature difference 92 is converted to a pseudo NOx target 94 via a non-linear, empirically derived curve 86, which is the same curve used to convert the NOx_req 84 factor to the NOx temperature difference 60.

The pseudo NOx target 94 is inverted and multiplied with the requested NOx level (NOx_req) 84 to yield a Q adjust (Q_adj) ratio (Q_adj) 96 of pseudo NOX target/NOx_req. The adjusted Q factor (Q_adj) 96 is converted to the delta-PM1 request command (DPM1) using the non-linear schedule 76 that relates the required delta-PM1 fuel split adjustment (command DPM1) to the Q factor 96. This schedule 76 is developed based on the effect of fuel splits on NOx emissions. The schedule 76 projects the NOx leveling error that would result in the base fuel splits would be applied to the combustor. Built into this schedule 76 is a prescribed relationship between PM1 and PM3. The delta-PM1 adjustment command (DPM1) is used to generate a delta-PM3 request command (DPM3) using the non-linear schedule 98 that reflects the relationship between DPM3 and DPM1. The fuel split requests (PM1, PM3) are generated as the sum of the delta-fuel splits (DPM1 and DPM3) and the base-load fuel split levels (PM1_base, PM3_base), respectively. The fuel split request commands (PM1, PM3) are used by the fuel control to govern the portion of fuel flowing to the various fuel nozzles.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method for scheduling a fuel split for a gas turbine combustor comprising:
   a. determining a target turbine exhaust temperature corresponding to a desired nitrogen oxide (NOx) at a reference fuel split;
   b. automatically determining an exhaust temperature error based on a comparison between a scheduled turbine exhaust temperature and the target turbine exhaust temperature;
   c. automatically converting the exhaust temperature error to a projected NOx leveling fuel split adjustment for the entire combustor;
   d. automatically adjusting the reference fuel split for the entire combustor using the projected NOx leveling fuel split adjustment, and
   e. automatically applying the adjusted fuel split to determine fuel flow to the entire combustor.

2. A method as in claim 1 wherein the target turbine exhaust temperature is determined based on at least one parameter of a group of parameters consisting of specific humidity, compressor inlet pressure loss and turbine exhaust back pressure.

3. A method as in claim 1 wherein the fuel split level is a plurality of fuel split levels each indicating a portion of fuel flow to one of a plurality of zones of fuel nozzles in the combustor.

4. A method as in claim 1 wherein steps (b) through (d) are performed in connection with a nitrogen oxide (NOx) leveling algorithm.

5. A method as in claim 1 wherein the comparison used to determine the exhaust temperature error is a difference between a scheduled turbine exhaust temperature and the target turbine exhaust temperature, and said difference is the exhaust temperature error.

6. A method for scheduling a fuel split for a gas turbine combustor comprising:
   f. determining a target exhaust temperature corresponding to a desired nitrogen oxide (NOx) at a reference fuel split;
   g. determining an exhaust temperature error based on a comparison between a scheduled exhaust temperature and the target exhaust temperature;
   h. converting the exhaust temperature error to a projected NOx leveling fuel split adjustment;
   j. adjusting the reference fuel split using the projected NOx leveling fuel split adjustment; and
   applying the adjusted fuel split to determine fuel flow to the combustor,
   wherein the conversion of the exhaust temperature error to the projected NOx leveling adjustment further comprises: determining a projected NOx level from the exhaust temperature error; determining an adjusted Q factor as a ratio of a NOx level baseline request and the projected NOx level, and applying the adjusted Q factor to determine the projected NOx level adjustment.

7. A method as in claim 6 further comprising determining the adjusted NOx level from the exhaust temperature error.

8. A method as in claim 7 wherein the determination of the adjusted NOx level from the exhaust temperature error further comprises correcting the exhaust temperature error account for a condition of a compressor in the gas turbine, and applying the corrected exhaust temperature error to an empirically derived curve relating corrected exhaust temperature error to the adjusted NOx level.

9. A method as in claim 8 wherein the condition of the compressor is a temperate of compressed air discharged from the compressor.

10. A method for scheduling a fuel split for a combustor of a gas turbine comprising:
    a. determining a target turbine exhaust temperature corresponding to a desired NOx emission level from the gas turbine at a reference fuel split schedule, wherein the target exhaust temperature is based on at least one parameter of a group of parameters consisting of specific humidity, compressor inlet pressure loss and turbine exhaust back pressure;
    b. automatically determining an exhaust temperature error based on a temperature difference between a scheduled turbine exhaust temperature and the target turbine exhaust temperature;
    c. automatically converting the exhaust temperature error to a projected NOx level error at the reference fuel schedule for the entire combustor, and
    d. automatically converting the projected NOx level error to an adjustment to the reference fuel schedule for the entire combustor.

11. A method as in claim 10 wherein the adjusted reference fuel split schedule further comprises an adjusted first fuel split indicating a portion of fuel flow to a primary fuel nozzle in the combustor and an adjusted second fuel spit indicating a portion of the fuel flow to be mixed with secondary air entering the combustor.

12. A method as in claim 10 wherein steps (b) through (d) are performed in connection with a nitrogen oxide (NOx) leveling algorithm.

13. A method for scheduling a fuel split for a combustor of a gas turbine comprising:
   a. determining a target exhaust temperature corresponding to a desired NOx emission level from the gas turbine at a reference fuel split schedule, wherein the target exhaust temperature is based on at least one parameter of a group of parameters consisting of specific humidity, compressor inlet pressure loss and turbine exhaust back pressure;
   b. determining an exhaust temperature error based on a temperature difference between a scheduled exhaust temperature and the target exhaust temperature;
   c. converting the exhaust temperature error to a projected NOx level error at the reference schedule, and
   d. converting the projected NOx level error to an adjustment to the reference fuel schedule;
   wherein the reference fuel split schedule is determined for a base load condition at which the gas turbine is operating at full rated power.

14. A method for scheduling a fuel split for a combustor of a gas turbine comprising:
   a. determining a target exhaust temperature corresponding to a desired NOx emission level from the gas turbine at a reference fuel split schedule, wherein the target exhaust temperature is based on at least one parameter of a group of parameters consisting of specific humidity, compressor inlet pressure loss and turbine exhaust back pressure;
   b. determining an exhaust temperature error based on a temperature difference between a scheduled exhaust temperature and the target exhaust temperature;
   c. converting the exhaust temperature error to a projected NOx level error at the reference schedule, and
   d. converting the projected NOx level error to an adjustment to the reference fuel schedule;
   wherein the conversion of the temperature difference further comprises: deriving an adjusted Q factor as a ratio of a NOx base request and an adjusted NOx level derived from the temperature difference; applying the adjusted Q factor to the reference fuel split schedule to generate the adjustment to the reference fuel schedule.

* * * * *